US012671616B2

(12) United States Patent
Li et al.

(10) Patent No.: US 12,671,616 B2
(45) Date of Patent: Jun. 30, 2026

(54) REFERENCE SIGNAL PARAMETER MODIFICATION FOR IMPROVED CHANNEL ESTIMATION IN WIRELESS COMMUNICATION SYSTEMS

(71) Applicant: ZTE Corporation, Shenzhen (CN)

(72) Inventors: Yong Li, Shenzhen (CN); Hao Wu, Shenzhen (CN); Yuxin Wang, Shenzhen (CN); Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 385 days.

(21) Appl. No.: 17/856,706

(22) Filed: Jul. 1, 2022

(65) Prior Publication Data

US 2022/0337462 A1 Oct. 20, 2022

Related U.S. Application Data

(63) Continuation of application No. PCT/CN2020/070241, filed on Jan. 3, 2020.

(51) Int. Cl.
*H04L 27/26* (2006.01)
*H04L 1/08* (2006.01)
(Continued)

(52) U.S. Cl.
CPC ............ *H04L 27/2613* (2013.01); *H04L 1/08* (2013.01); *H04L 5/0051* (2013.01);
(Continued)

(58) Field of Classification Search
CPC ..... H04L 27/2613; H04L 1/08; H04L 5/0051; H04L 5/0048; H04W 72/0446;
(Continued)

(56) References Cited

U.S. PATENT DOCUMENTS 10,999,032 B2 5/2021 Choi et al.
2017/0288832 A1* 10/2017 Islam ................... H04L 5/0048
(Continued)

FOREIGN PATENT DOCUMENTS

CN 108365933 A 8/2018
CN 109462462 A 3/2019
(Continued)

OTHER PUBLICATIONS

Partial European Search Report for EP Patent Application No. 20886599.8, dated Nov. 22, 2022, 14 pages.
(Continued)

*Primary Examiner* — Justin T Van Roie
(74) *Attorney, Agent, or Firm* — Perkins Coie LLP

(57) ABSTRACT

Methods, systems, and devices for modifying reference signal parameters to improve channel estimation in mobile communication technology are described. An example method for wireless communication includes transmitting, by a first communication node to a second communication node, a reference signal, at least one parameter of the reference signal having been modified based on a Downlink Control Information (DCI) format message or a Medium Access Control (MAC) message, and the at least one parameter comprising one or more of a number of orthogonal frequency division multiplexing (OFDM) symbols in the reference signal, a number of OFDM symbols in the reference signal in a frequency-domain range, a time-domain position of a first symbol of the reference signal, and a number of repeated transmissions of the reference signal.

16 Claims, 6 Drawing Sheets

(51) Int. Cl.

| | |
|---|---|
| *H04L 5/00* | (2006.01) |
| *H04W 72/0446* | (2023.01) |
| *H04W 72/0453* | (2023.01) |
| *H04W 72/23* | (2023.01) |
| *H04W 80/02* | (2009.01) |

(52) U.S. Cl.
CPC ... *H04W 72/0446* (2013.01); *H04W 72/0453* (2013.01); *H04W 72/23* (2023.01); *H04W 80/02* (2013.01)

(58) Field of Classification Search
CPC . H04W 72/0453; H04W 72/23; H04W 80/02; Y02D 30/70
See application file for complete search history.

(56) References Cited

U.S. PATENT DOCUMENTS

| | | | |
|---|---|---|---|
| 2019/0349168 A1 | 11/2019 | Liu et al. | |
| 2020/0028643 A1* | 1/2020 | Kim ..................... | H04L 5/0048 |
| 2020/0359402 A1 | 11/2020 | Xing et al. | |
| 2021/0360389 A1* | 11/2021 | Levitsky .............. | H04W 76/11 |

FOREIGN PATENT DOCUMENTS

| | | | |
|---|---|---|---|
| CN | 110099445 | A | 8/2019 |
| CN | 110535603 | A | 12/2019 |
| EP | 3579480 | A1 | 12/2019 |
| WO | 2019022653 | A1 | 1/2019 |
| WO | 2019074267 | A1 | 4/2019 |
| WO | 2019084570 | A1 | 5/2019 |

OTHER PUBLICATIONS

European Search Report for EP Patent Application No. 20886599.8, dated Feb. 23, 2023, 13 pages.
International Search Report and Written Opinion for International Application No. PCT/CN2020/070241, mailed on Sep. 23, 2020 (8 pages).
Chinese office action issued in CN Patent Application No. 202080081805.7, dated Jul. 27, 2024, 17 pages. English translation included.
European Communication pursuant to Article 94(3) EPC issued in EP Patent Application No. 20886599.8, dated Nov. 27, 2024, 8 pages.
Chinese Notification to Complete Formalities of Registration issued in CN Patent Application No. 202080081805.7, dated Jan. 1, 2025, 2 pages.

\* cited by examiner

Figure 2:
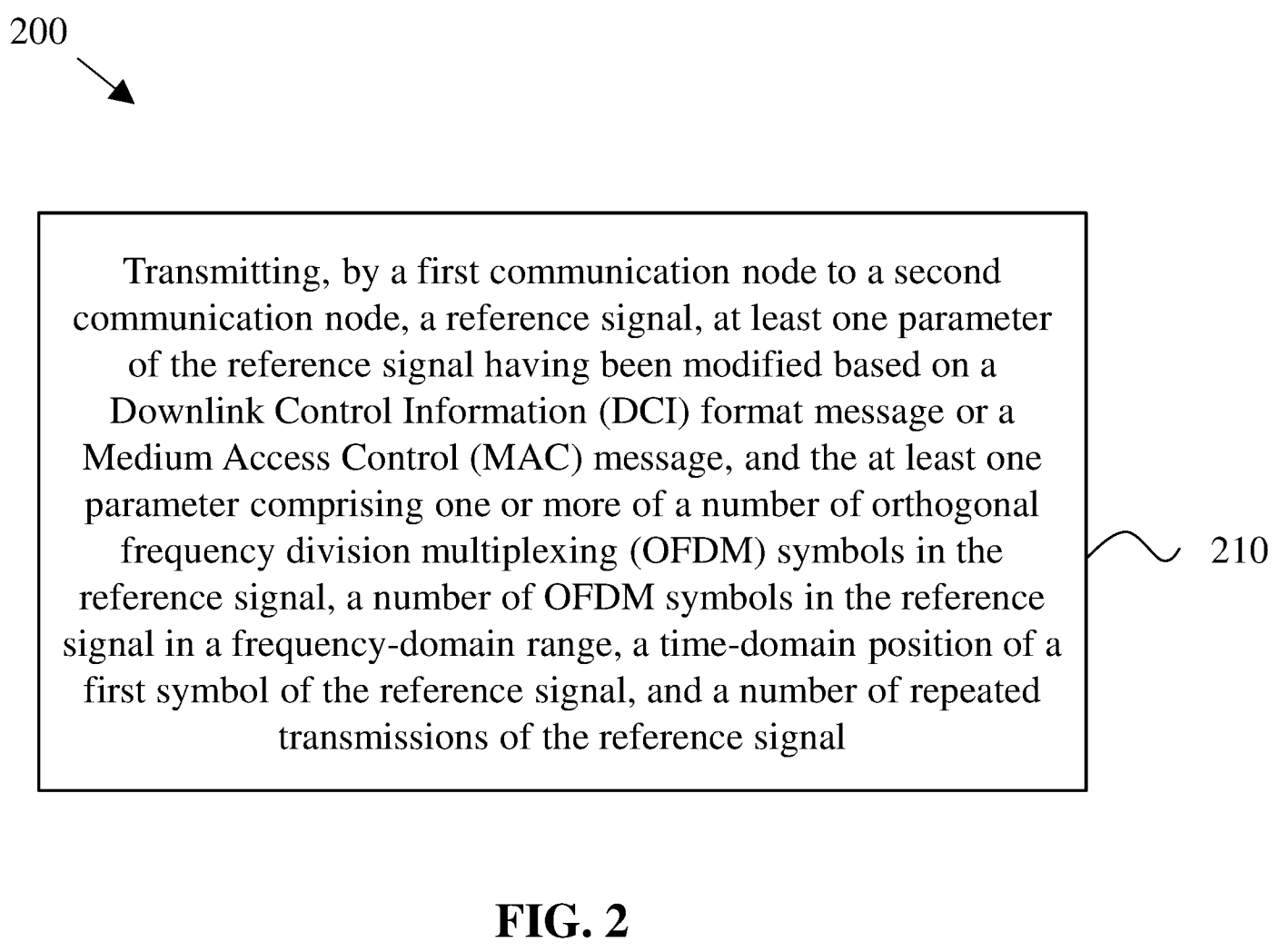

200

210

Transmitting, by a first communication node to a second communication node, a reference signal, at least one parameter of the reference signal having been modified based on a Downlink Control Information (DCI) format message or a Medium Access Control (MAC) message, and the at least one parameter comprising one or more of a number of orthogonal frequency division multiplexing (OFDM) symbols in the reference signal, a number of OFDM symbols in the reference signal in a frequency-domain range, a time-domain position of a first symbol of the reference signal, and a number of repeated transmissions of the reference signal

Figure 3:
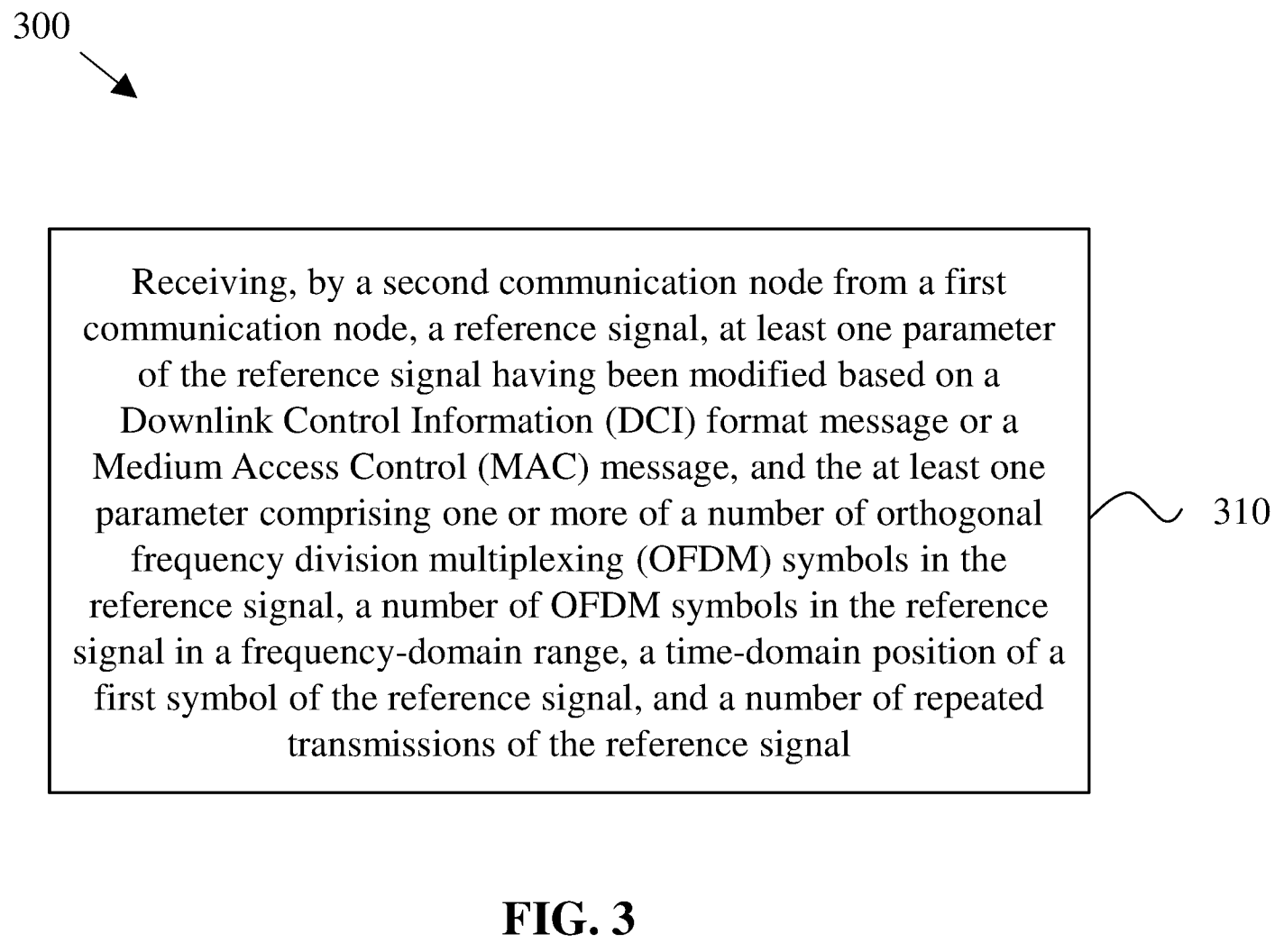

Receiving, by a second communication node from a first communication node, a reference signal, at least one parameter of the reference signal having been modified based on a Downlink Control Information (DCI) format message or a Medium Access Control (MAC) message, and the at least one parameter comprising one or more of a number of orthogonal frequency division multiplexing (OFDM) symbols in the reference signal, a number of OFDM symbols in the reference signal in a frequency-domain range, a time-domain position of a first symbol of the reference signal, and a number of repeated transmissions of the reference signal

Figure 4:
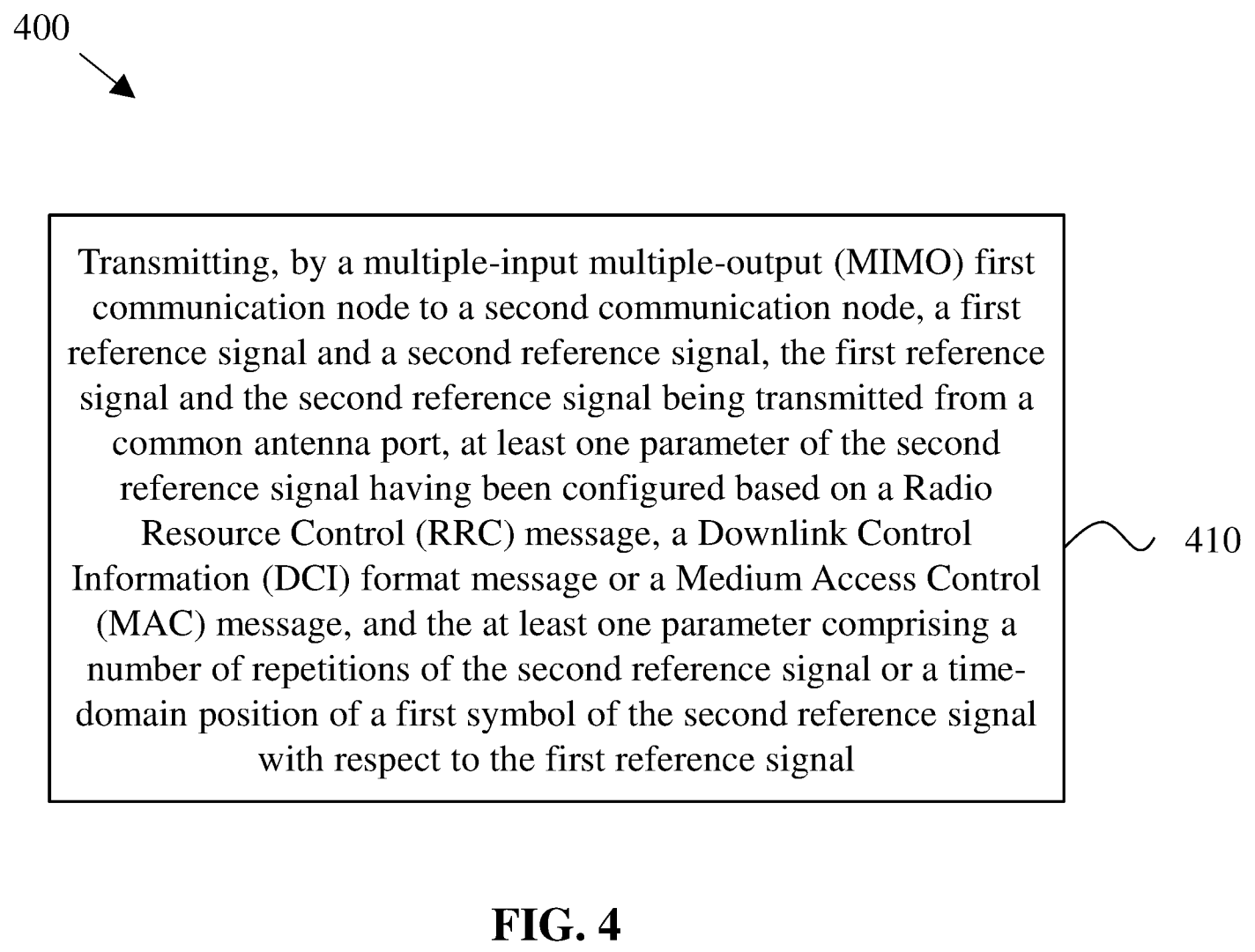

Transmitting, by a multiple-input multiple-output (MIMO) first communication node to a second communication node, a first reference signal and a second reference signal, the first reference signal and the second reference signal being transmitted from a common antenna port, at least one parameter of the second reference signal having been configured based on a Radio Resource Control (RRC) message, a Downlink Control Information (DCI) format message or a Medium Access Control (MAC) message, and the at least one parameter comprising a number of repetitions of the second reference signal or a time-domain position of a first symbol of the second reference signal with respect to the first reference signal

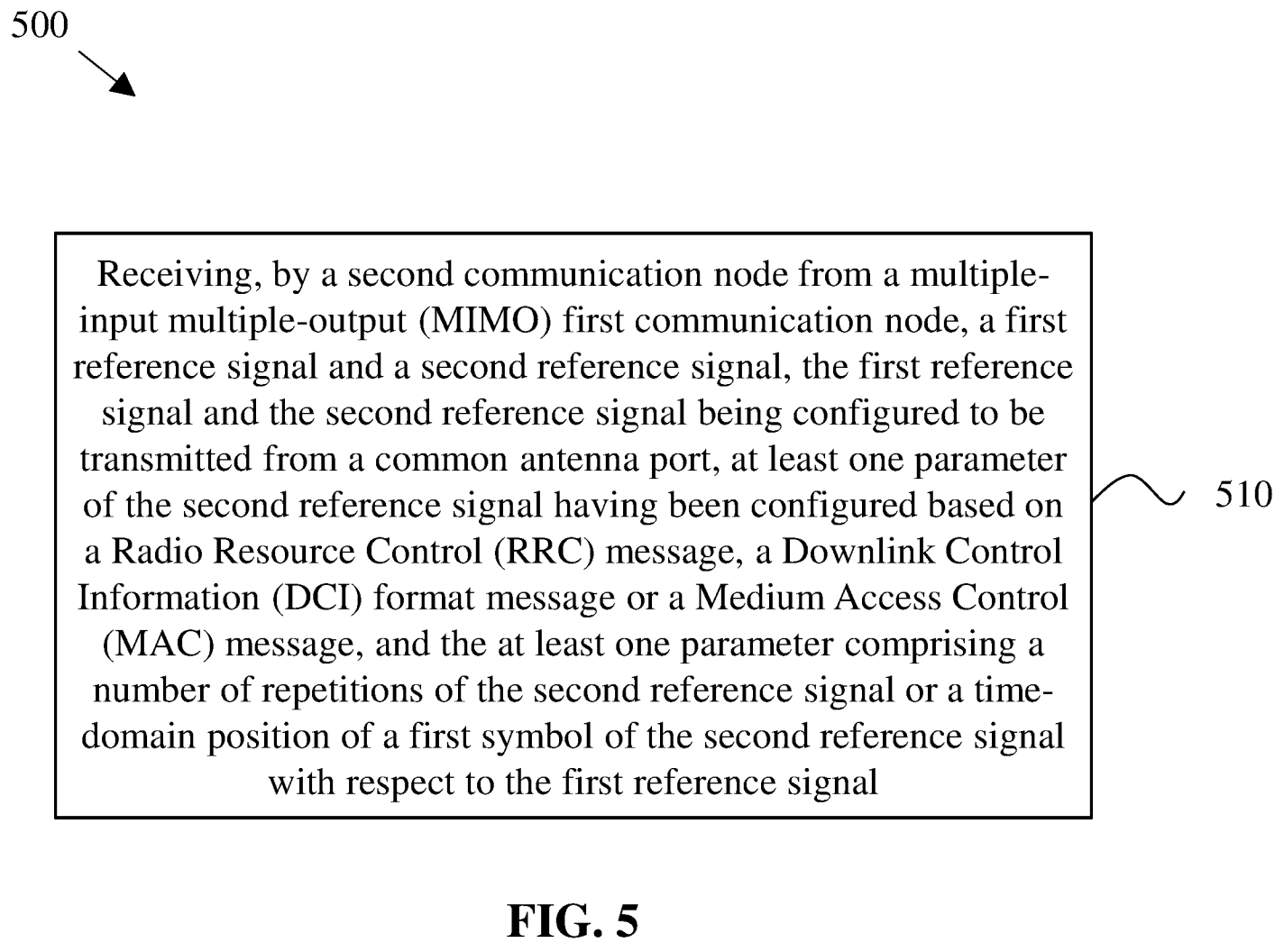

Receiving, by a second communication node from a multiple-input multiple-output (MIMO) first communication node, a first reference signal and a second reference signal, the first reference signal and the second reference signal being configured to be transmitted from a common antenna port, at least one parameter of the second reference signal having been configured based on a Radio Resource Control (RRC) message, a Downlink Control Information (DCI) format message or a Medium Access Control (MAC) message, and the at least one parameter comprising a number of repetitions of the second reference signal or a time-domain position of a first symbol of the second reference signal with respect to the first reference signal

FIG. 5

REFERENCE SIGNAL PARAMETER MODIFICATION FOR IMPROVED CHANNEL ESTIMATION IN WIRELESS COMMUNICATION SYSTEMS

CROSS-REFERENCE TO RELATED APPLICATIONS

This application is a continuation of International Patent Application No. PCT/CN2020/070241, filed on Jan. 3, 2020, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices, as well as support for higher data rates.

SUMMARY

This document relates to methods, systems, and devices for modifying reference signal parameters to improve channel estimation in mobile communication technology, including 5th Generation (5G) and New Radio (NR) communication systems.

In one exemplary aspect, a wireless communication method is disclosed. The method includes transmitting, by a first communication node to a second communication node, a reference signal, wherein at least one parameter of the reference signal has been modified based on a Downlink Control Information (DCI) format message or a Medium Access Control (MAC) message, and wherein the at least one parameter comprises one or more of a number of orthogonal frequency division multiplexing (OFDM) symbols in the reference signal, a number of OFDM symbols in the reference signal in a frequency-domain range, a time-domain position of a first symbol of the reference signal, and a number of repeated transmissions of the reference signal.

In another exemplary aspect, a wireless communication method is disclosed. The method includes receiving, by a second communication node from a first communication node, a reference signal, wherein at least one parameter of the reference signal has been modified based on a Downlink Control Information (DCI) format message or a Medium Access Control (MAC) message, and wherein the at least one parameter comprises one or more of a number of orthogonal frequency division multiplexing (OFDM) symbols in the reference signal, a number of OFDM symbols in the reference signal in a frequency-domain range, a time-domain position of a first symbol of the reference signal, and a number of repeated transmissions of the reference signal.

In yet another exemplary aspect, a wireless communication method is disclosed. The method includes transmitting, by a multiple-input multiple-output (MIMO) first communication node to a second communication node, a first reference signal and a second reference signal, wherein the first reference signal and the second reference signal are transmitted from a common antenna port, wherein at least one parameter of the second reference signal has been configured based on a Radio Resource Control (RRC) message, a Downlink Control Information (DCI) format message or a Medium Access Control (MAC) message, and wherein the at least one parameter comprises a number of repetitions of the second reference signal or a time-domain position of a first symbol of the second reference signal with respect to the first reference signal.

In yet another exemplary aspect, a wireless communication method is disclosed. The method includes receiving, by a second communication node from a multiple-input multiple-output (MIMO) first communication node, a first reference signal and a second reference signal, wherein the first reference signal and the second reference signal are configured to be transmitted from a common antenna port, wherein at least one parameter of the second reference signal has been configured based on a Radio Resource Control (RRC) message, a Downlink Control Information (DCI) format message or a Medium Access Control (MAC) message, and wherein the at least one parameter comprises a number of repetitions of the second reference signal or a time-domain position of a first symbol of the second reference signal with respect to the first reference signal.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 2 shows an example of a wireless communication method, in accordance with some embodiments of the presently disclosed technology.

FIG. 3 shows another example of a wireless communication method, in accordance with some embodiments of the presently disclosed technology.

FIG. 4 shows yet another example of a wireless communication method, in accordance with some embodiments of the presently disclosed technology.

FIG. 5 shows yet another example of a wireless communication method, in accordance with some embodiments of the presently disclosed technology.

DETAILED DESCRIPTION

Wireless communication is ubiquitous in everyday life and industry. The 5th generation New Radio (referred to as 5G NR) wireless communication network is designed based on OFDM technology. The time-domain structure of an OFDM transmission comprises a radio frame consisting of a number of time slots, with each time slot consisting of a number of OFDM symbols. The frequency-domain structure of an OFDM transmission is divided into resource blocks (RBs), each having a certain number of sub-carriers.

In this generation of communication networks, base stations (BS s) and terminals employ channel estimation to generate an estimate of the channel, which is used in demodulating and decoding the received signal. A BS or terminal may estimate the channel by transmitting a reference signal (RS) in order to estimate the channel.

Figure 1:
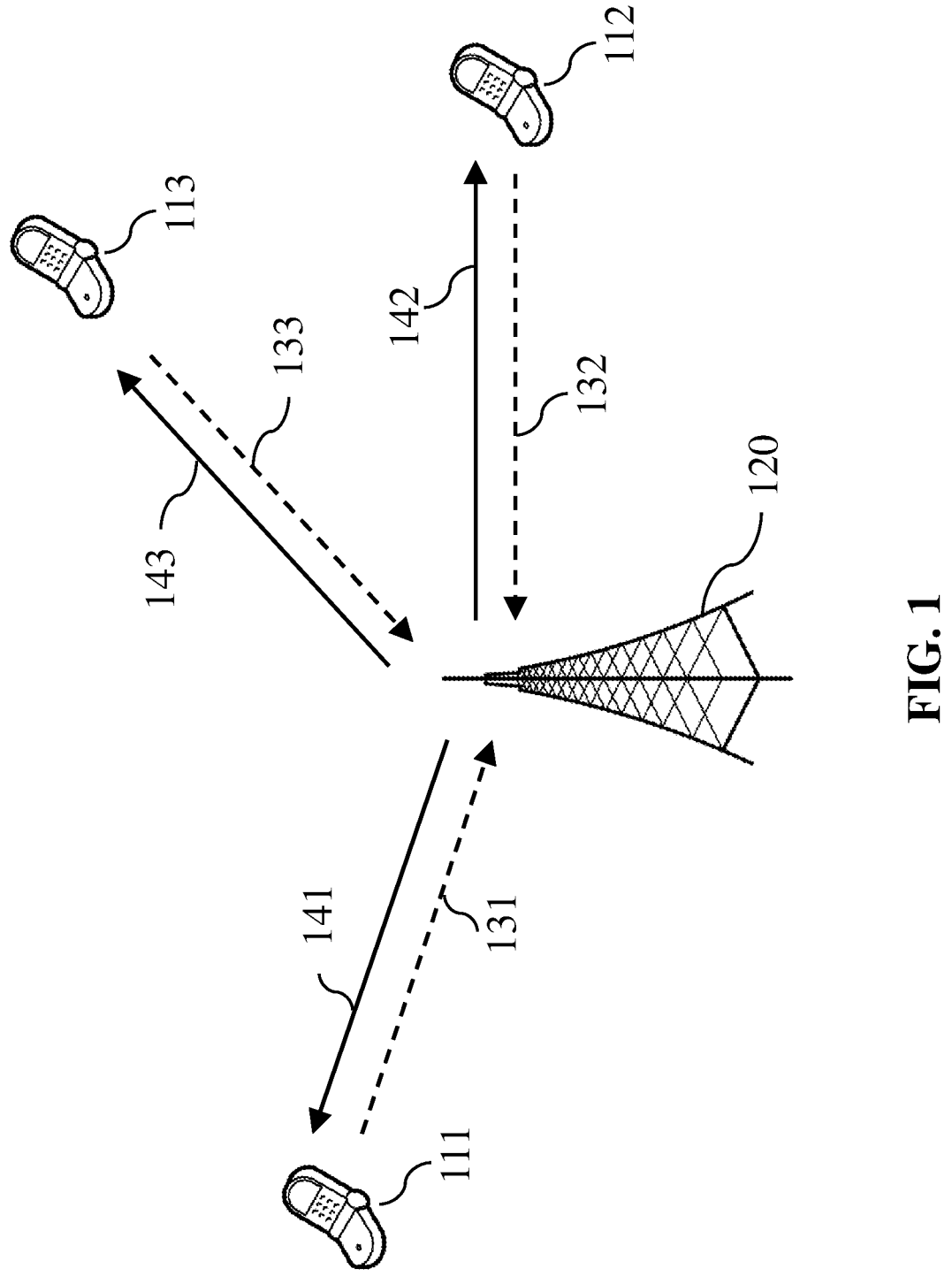
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 and one or more user equipment (UE) 111, 112 and 113. In some embodiments, the downlink transmissions (141, 142, 143) include one or more reference signals. In response, each of the UEs uses the reference signals for channel estimation, and then performs a subsequent transmission (131, 132, 133, respectively), which has accounted for variations in the wireless channel, to the BS 120. The UE may be, for example, a smartphone, a tablet, a mobile computer, a machine to machine (M2M) device, a terminal, a mobile device, an Internet of Things (IoT) device, and so on.

The present document uses examples from the 3GPP New Radio (NR) network architecture and 5G protocol only to facilitate understanding and the disclosed techniques and embodiments may be practiced in other wireless systems that use different communication protocols than the 3GPP protocols.

In the example shown in FIG. 1, the transmission parameters of the reference signals (e.g., 141, 142, 143) are configured, for example, by the base station through Radio Resource Control (RRC) signaling. However, the wireless channel between the BS 120 and UEs (111, 112 and 113) is typically a time-varying channel, which can be susceptible to fading. Thus, when the wireless channel is in a fading period, the reference signal that is transmitted has been configured based on previous channel conditions (and using previous transmission parameters). The signal-to-noise ratio (SNR) of the received reference signal is usually low, which consequently results in poor channel estimation accuracy, and thus a transmission scheme that matches the current channel conditions cannot be generated. Similarly, when the low-accuracy channel estimates are used for data demodulation, the data demodulation performance will also be reduced.

Examples of a reference signal include a channel state information reference signal (CSI-RS), a data demodulation reference signal (DMRS), a sounding reference signal (SRS), and the like. The received signal-to-noise ratio (SNR) of the reference signal directly affects the estimation accuracy of the channel, thereby affecting the performance of the transmission scheme and data demodulation performance.

Based on their time-domain characteristics, reference signals are divided into three types: periodic, semi-persistent, and non-periodic (or aperiodic). In some embodiments (e.g., periodic scheduling), the base station configures the transmission parameters of the reference signal through radio resource control (RRC) signaling, after which the reference signal is transmitted using those parameters in a periodic fashion. In other embodiments (e.g., semi-persistent scheduling), the reference signal is transmitted using the configured transmission parameters after an activation instruction is communicated by Medium Access Control (MAC) signaling, and its transmission is stopped upon communication of a deactivation instruction. In yet other embodiments (e.g., aperiodic scheduling), a reference signal is transmitted using the configured parameter upon being triggered by information carried in a Downlink Control Information (DCI) format message.

Embodiments of the disclosed technology are directed towards modifying the parameters of a reference signal, which is then transmitted and used to improve the accuracy of channel estimation.

In some embodiments, the first communication node (e.g., BS 120 in FIG. 1) notifies the second communication node (e.g., UEs 111, 112 and 113 in FIG. 1) of transmission parameters for a first reference signal through RRC signaling. The transmission parameters may include the time-domain position of the starting OFDM symbol of the reference signal, the number of OFDM symbols used by the reference signal, the number of OFDM symbols used by the reference signal in the frequency domain (e.g., number of subcarriers or RBs used), and the type of time-domain behavior of the reference signal (e.g., periodic, semi-persistent, aperiodic). The first communication node receives the first reference signal transmitted by the second communication node according to the configured transmission parameters.

Because the wireless channel is a time-varying channel, the transmission parameters of the reference signal configured by RRC signaling may not match the current wireless channel conditions. An exemplary solution to this problem entails the first communication node modifying the transmission parameters of (or adding additional transmission parameters to) the first reference signal through signaling. In an example, the transmission parameters of the first reference signal may be modified using Downlink Control Information (DCI) format signaling or Medium Access Control (MAC) signaling. By modifying the transmission parameters of the first reference signal, the first reference signal transmission can be matched with the current wireless channel state.

In some embodiments, the following may be implemented to attempt to match the transmission parameters to the current wireless channel:

modifying the number of OFDM symbols used for the first reference signal by increasing or decreasing the number of OFDM symbols, modifying the number of OFDM symbols that can be used for channel estimation by the receiving end, so as to control the SNR of the received reference signal and achieve the desired quality of the control channel estimate, modifying the number of OFDM symbols used by the first reference signal in the frequency-domain (e.g., the number of subcarriers or RBs), varying the transmission of the reference signal on different OFDM symbols, along with a change in the frequency-domain position of the reference signal, in order to estimate the channel performance in a particular frequency-domain since the reference signal uses multiple OFDM symbols within the same frequency domain, modifying the number of OFDM symbols used by the reference signal in a particular frequency-domain, so as to avoid performance degradation of channel estimation in a particular frequency range due to changes in the wireless channel, and modifying the time-domain starting position of the first OFDM symbol of the first reference signal, so as to avoid interference and to avoid the first reference signal from interfering with other signals.

In some embodiments, one of the parameters that can be modified or indicated through signaling includes the number of times the first reference signal is transmitted. The number of times the first reference signal is transmitted can be varied to avoid degradation of the channel estimation performance because the reference signals from each of the transmissions can be combined to perform channel estimation.

In some embodiments, the number of times the first reference signal is transmitted can be indicated in the following ways:

(1) Indicate that the first reference signal is to be transmitted M times within a certain time period, where M is an integer greater than 1.

(2) In the scenario that the first reference signal is a periodic reference signal, indicate that the first reference signal is transmitted K times per cycle (period) in N consecutive cycles.

(3) Indicate that on the available OFDM symbols, the first reference signal is continuously transmitted M times, one after the other.

(4) Indicate a time interval of the first reference signal between adjacent transmissions.

(5) Indicate the number of times the first reference signal is transmitted in a time slot.

In some embodiments, the first communication node modifies a transmission parameter of the first reference signal through signaling, and further includes an identifier indicating the modified first reference signal. An identifier of the first reference signal is used to indicate that a transmission parameter of a specific reference signal has been modified.

In some embodiments, the first communication node notifies the second communication node of the configuration of a second reference signal through Radio Resource Control (RRC) signaling. In an example, the configuration parameters include: an identifier of the second reference signal and an association between the second reference signal and the first reference signal.

In some embodiments, the first communication node triggers the transmission of the second reference signal through Downlink Control Information (DCI) format signaling or Medium Access Control (MAC) signaling, and also indicates the transmission parameters of the second reference signal.

In other embodiments, the first communication node notifies the second communication node of the configuration of the second reference signal through Radio Resource Control (RRC) signaling. Herein, the configuration parameters include an identifier of the second reference signal and the second reference signal being associated with the first reference signal.

In yet other embodiments, the first communication node triggers the transmission of the second reference signal through Downlink Control Information (DCI) format signaling or Medium Access Control (MAC) signaling, indicates the transmission parameters of the second reference signal, and further indicates that the first reference signal is associated with the second reference signal.

In yet other embodiments, the first communication node notifies the second communication node of the configuration of the second reference signal through RRC signaling. Herein, the configuration parameters include an identifier of the second reference signal.

In yet other embodiments, the first communication node triggers the transmission of the second reference signal through DCI format signaling or MAC signaling, indicating the transmission parameters of the second reference signal, and further indicating the first reference signal is associated with the second reference signal.

In the embodiments described in this document, an association between the first and second reference signals is in a multiple-input multiple-output (MIMO) system, and refers to the second reference signal and the first reference signal being transmitted from a common antenna port. Because the second reference signal and the first reference signal are transmitted through a common antenna port, they are subject to the same wireless channel. Thus, the receiving end can perform a joint channel estimation operation on the second reference signal and the first reference signal, thereby improving the performance of channel estimation.

In some embodiments, the first communication node notifies the second communication node of the configuration of the second reference signal through RRC signaling, and the configuration parameters further include an indication that the second reference signal is being repeated with respect to the first reference signal that it is associated with. Amongst other benefits, configuring a repetition factor (R>1) for the second reference signal advantageously ensures the transmission parameters of the second reference signal, as well as the second reference signal itself, are received robustly and accurately.

In some embodiments, the first communication node indicates the transmission parameters of the second reference signal through DCI format signaling or MAC signaling. The indicated transmission parameters of the second reference signal include an indication of whether the associated first reference signal is repeated, an indication of the OFDM symbol where the reference signal is located.

In some embodiments, the second reference signal is configured to repeat a part of the first reference signal, and by indicating the OFDM symbol at which the first reference signal is repeated, the part of the first reference signal that is repeated may be indicated.

In some embodiments, the indicated transmission parameters of the second reference signal include the number of times the second reference signal repeats with respect to the associated first reference signal. In an example, the second reference signal may need to be repeated multiple times to avoid degradation of the channel estimation performance. Thus, providing an indication of the number of times that the second reference signal is repeated enables improved channel estimation, and subsequently, better data demodulation performance.

In some embodiments, the indicated transmission parameters of the second reference signal further include a starting OFDM symbol where the second reference signal is located. The starting OFDM symbol where the second reference signal is located is determined by the starting OFDM symbol where the associated first reference signal is located. In an example, the starting OFDM symbol of the second reference signal may be located in the same time slot as the starting OFDM symbol of the first reference signal. In another example, the starting OFDM symbol of the second reference signal may be located at the next available time slot of the time slot of the starting OFDM symbol of the first reference signal. The obtainable time slot refers to a time slot that can be used for transmitting the reference signal. In yet another example, the starting OFDM symbol of the second reference signal is located next to the OFDM symbol that can be obtained from the starting OFDM symbol of the first reference signal. In yet another example, a location of the starting OFDM symbol of the first reference signal is used as a reference, and the second reference signal is transmitted every K OFDM symbols on the available OFDM symbols. In yet another example, a location of the time slot of the first reference signal is used as a reference, and the second reference signal is transmitted every K time slots on the available time slots. In yet another example, the first reference signal is divided into two parts—the second reference signal part that repeats the first part of the first reference signal is transmitted before the first reference signal, and the second reference signal part that repeats the second part of the first reference signal is transmitted afterwards.

The following exemplary technical solutions may be implemented based on the described embodiments of the disclosed technology:

(1) The first communication node modifies a transmission parameter (or adds/indicates a new, or previously unused, transmission parameter) of the first reference signal through signaling.

(2) Modify the number of OFDM symbols used by the first reference signal.

(3) Modify the number of OFDM symbols used by the first reference signal in the frequency-domain (e.g., the number of subcarriers or RBs).

(4) Modify a time-domain position of the starting OFDM symbol of the first reference signal.

(5) Modify or add the number of times the first reference signal is transmitted.

(6) The indication of the number of times the first reference signal is transmitted may be
   (a) An indication that the first reference signal is transmitted M times within a certain time period, and M is an integer greater than 1.
   (b) Given that the first reference signal is a periodic reference signal, an indication that the first reference signal is transmitted K times in each period in consecutive N periods.
   (c) An indication that on the available OFDM symbols, the first reference signal is transmitted M times consecutively one after the other.
   (d) An indication of the time interval of the first reference signal between adjacent transmissions.
   (e) An indication of the number of times the first reference signal is transmitted in a time slot.

(7) The first communication node modifies or adds a transmission parameter of the first reference signal through signaling, and further includes (e.g., as part of the signaling) an identifier indicating the modified first reference signal.

(8) The first communication node notifies the second communication node of the configuration of the second reference signal through RRC signaling, and the configuration parameters include an identifier of the second reference signal, and the second reference signal being associated with the first reference signal.

(9) The first communication node notifies the second communication node of the configuration of the second reference signal through RRC signaling, and the configuration parameters further include an indication that the second reference signal is being repeated with respect to the associated first reference signal.

(10) The first communication node indicates transmission parameters of the second reference signal through DCI format signaling or MAC signaling, and the indicated transmission parameters of the second reference signal include an indication of whether the associated first reference signal is repeated and an indication of the OFDM symbol where the reference signal is located.

(11) The indicated transmission parameters of the second reference signal include the number of times the second reference signal repeats the associated first reference signal.

(12) The indicated transmission parameters of the second reference signal further include a starting OFDM symbol where the second reference signal is located.

(13) The starting OFDM symbol where the second reference signal is located is determined by the starting OFDM symbol where the associated first reference signal is located.

FIG. 2 shows an example of a wireless communication method 200 for modifying reference signal parameters to improve channel estimation. The method 200 includes, at operation 210, transmitting, by a first communication node to a second communication node, a reference signal, at least one parameter of the reference signal having been modified based on a Downlink Control Information (DCI) format message or a Medium Access Control (MAC) message, and the at least one parameter comprising one or more of a number of orthogonal frequency division multiplexing (OFDM) symbols in the reference signal, a number of OFDM symbols in the reference signal in a frequency-domain range, a time-domain position of a first symbol of the reference signal, and a number of repeated transmissions of the reference signal.

FIG. 3 shows an example of a wireless communication method 300 for modifying reference signal parameters to improve channel estimation. The method 300 includes, at operation 310, receiving, by a second communication node from a first communication node, a reference signal, at least one parameter of the reference signal having been modified based on a Downlink Control Information (DCI) format message or a Medium Access Control (MAC) message, and the at least one parameter comprising one or more of a number of orthogonal frequency division multiplexing (OFDM) symbols in the reference signal, a number of OFDM symbols in the reference signal in a frequency-domain range, a time-domain position of a first symbol of the reference signal, and a number of repeated transmissions of the reference signal.

FIG. 4 shows an example of a wireless communication method 400 for modifying reference signal parameters to improve channel estimation. The method 400 includes, at operation 410, transmitting, by a multiple-input multiple-output (MIMO) first communication node to a second communication node, a first reference signal and a second reference signal, the first reference signal and the second reference signal are transmitted from a common antenna port, at least one parameter of the second reference signal having been configured based on a Radio Resource Control (RRC) message, a Downlink Control Information (DCI) format message or a Medium Access Control (MAC) message, and the at least one parameter comprising a number of repetitions of the second reference signal or a time-domain position of a first symbol of the second reference signal with respect to the first reference signal.

FIG. 5 shows an example of a wireless communication method 500 for modifying reference signal parameters to improve channel estimation. The method 500 includes, at operation 510, receiving, by a second communication node from a multiple-input multiple-output (MIMO) first communication node, a first reference signal and a second reference signal, the first reference signal and the second reference signal are configured to be transmitted from a common antenna port, at least one parameter of the second reference signal having been configured based on a Radio Resource Control (RRC) message, a Downlink Control Information (DCI) format message or a Medium Access Control (MAC) message, and the at least one parameter comprising a number of repetitions of the second reference signal or a time-domain position of a first symbol of the second reference signal with respect to the first reference signal.

In some embodiments, the following technical solutions can be implemented:

A1. A method for wireless communication, comprising: transmitting, by a first communication node to a second communication node, a reference signal, wherein at least one parameter of the reference signal has been modified based on a Downlink Control Information (DCI) format message or a Medium Access Control (MAC) message, and wherein the at least one parameter comprises one or more of a number of orthogonal frequency division multiplexing (OFDM) symbols in the reference signal, a number of OFDM symbols in the reference signal in a frequency-domain range, a time-domain position of a first symbol of the reference signal, and a number of repeated transmissions of the reference signal.

A2. A method for wireless communication, comprising: receiving, by a second communication node from a first communication node, a reference signal, wherein at least one parameter of the reference signal has been modified based on a Downlink Control Information (DCI) format message or a Medium Access Control (MAC) message, and wherein the at least one parameter comprises one or more of a number of orthogonal frequency division multiplexing (OFDM) symbols in the reference signal, a number of OFDM symbols in the reference signal in a frequency-domain range, a time-domain position of a first symbol of the reference signal, and a number of repeated transmissions of the reference signal.

A3. The method of solution A2, further comprising: performing, based on the reference signal, a channel estimation operation.

A4. The method of any of solutions A1 to A3, wherein an indication corresponding to the number of repeated transmissions is signaled in the DCI message or the MAC message.

A5. The method of solution A4, wherein the indication comprises a number of times (M) the reference signal is repeated within a predetermined time period, wherein M is an integer that is greater than one.

A6. The method of solution A4, wherein the reference signal comprises a periodic reference signal, wherein the indication comprises a number of times (K) the reference signal is repeated in each period in N consecutive periods, and wherein K and N are positive integers.

A7. The method of solution A4, wherein the indication comprises a number of times (M) the reference signal is repeated consecutively over available OFDM symbols.

A8. The method of solution A4, wherein the indication comprises a time interval of the reference signal between adjacent transmissions.

A9. The method of solution A4, wherein the indication comprises a number of times (K) the reference signal is repeated in a time slot.

A10. The method of any of solutions A1 to A3, wherein the DCI message or the MAC message further comprises an identifier corresponding to the reference signal.

A11. The method of any of solutions A1 to A10, wherein the first communication node is a network node and the second communication node is a wireless device.

A12. The method of solution A11, wherein the reference signal is a channel state information reference signal (CSI-RS), a demodulation reference signal (DMRS) or a phase tracking reference signal (PTRS).

A13. The method of any of solutions A1 to A10, wherein the first communication node is a wireless device and the second communication node is a network node.

A14. The method of solution A13, wherein the reference signal is a sounding reference signal (SRS), a demodulation reference signal (DMRS) or a phase tracking reference signal (PTRS).

A15. A method for wireless communication, comprising: transmitting, by a multiple-input multiple-output (MIMO) first communication node to a second communication node, a first reference signal and a second reference signal, wherein the first reference signal and the second reference signal are transmitted from a common antenna port, wherein at least one parameter of the second reference signal has been configured based on a Radio Resource Control (RRC) message, a Downlink Control Information (DCI) format message or a Medium Access Control (MAC) message, and wherein the at least one parameter comprises a number of repetitions of the second reference signal or a time-domain position of a first symbol of the second reference signal with respect to the first reference signal.

A16. A method for wireless communication, comprising: receiving, by a second communication node from a multiple-input multiple-output (MIMO) first communication node, a first reference signal and a second reference signal, wherein the first reference signal and the second reference signal are configured to be transmitted from a common antenna port, wherein at least one parameter of the second reference signal has been configured based on a Radio Resource Control (RRC) message, a Downlink Control Information (DCI) format message or a Medium Access Control (MAC) message, and wherein the at least one parameter comprises a number of repetitions of the second reference signal or a time-domain position of a first symbol of the second reference signal with respect to the first reference signal.

A17. The method of solution A16, further comprising: performing, based on the first reference signal and the second reference signal, a joint channel estimation operation.

A18. The method of any of solutions A15 to A17, wherein the first communication node is a network node and the second communication node is a wireless device.

A19. The method of solution A18, wherein the first reference signal is a channel state information reference signal (CSI-RS), a demodulation reference signal (DMRS) or a phase tracking reference signal (PTRS).

A20. The method of any of solutions A15 to A17, wherein the first communication node is a wireless device and the second communication node is a network node.

A21. The method of solution A20, wherein the first reference signal is a sounding reference signal (SRS), a demodulation reference signal (DMRS) or a phase tracking reference signal (PTRS).

A22. A wireless communications apparatus comprising a processor and a memory, wherein the processor is configured to read code from the memory and implement a method recited in any of solutions A1 to A21.

A23. A computer program product comprising a computer-readable program medium code stored thereupon, the code, when executed by a processor, causing the processor to implement a method recited in any of solutions A1 to A21.

Figure 6:
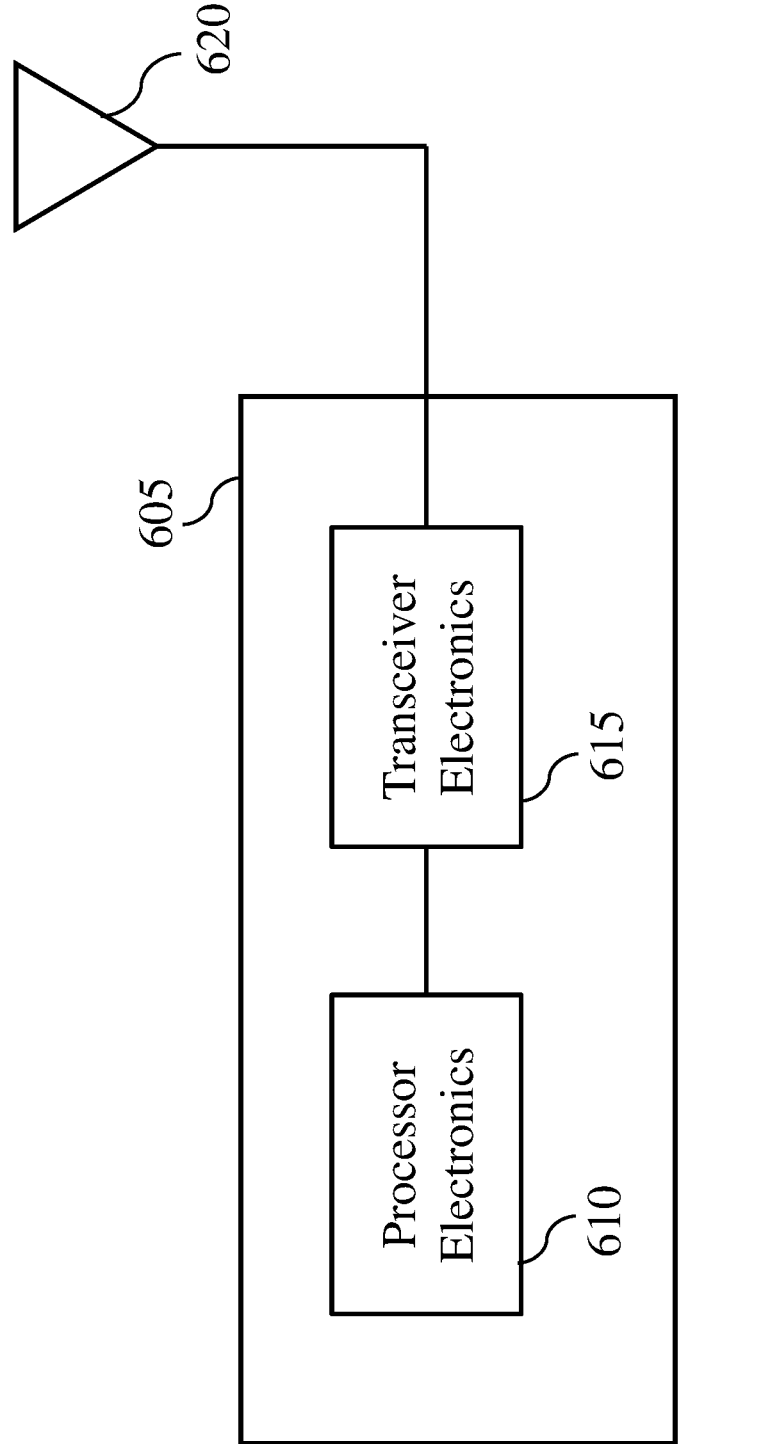
FIG. 6 is a block diagram representation of a portion of an apparatus that can be configured to implement embodiments of the presently disclosed technology.

FIG. 6 is a block diagram representation of a portion of an apparatus, in accordance with some embodiments of the presently disclosed technology. An apparatus 605, such as a base station or a wireless device (or UE), can include processor electronics 610 such as a microprocessor that implements one or more of the techniques presented in this document. The apparatus 605 can include transceiver electronics 615 to send and/or receive wireless signals over one or more communication interfaces such as antenna(s) 620. The apparatus 605 can include other communication interfaces for transmitting and receiving data. Apparatus 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the apparatus 605.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:

receiving, by a first communication node from a second communication node, a Radio Resource Control (RRC) message comprising at least one parameter of a reference signal;

receiving, by the first communication node from the second communication node, a Downlink Control Information (DCI) format message or a Medium Access Control (MAC) message that is configured to cause the first communication node to modify the at least one parameter of the reference signal included in the RRC message;

modifying the at least one parameter of the reference signal based on the Downlink Control Information (DCI) format message or the Medium Access Control (MAC) message; and transmitting, after the modifying of the at least one parameter of the reference signal, by the first communication node to the second communication node, the reference signal, wherein at least one modified parameter comprises a time-domain position of a first symbol of the reference signal and a number of repeated transmissions of the first reference signal, and wherein the first communication node is a wireless device and the second communication node is a network node.

2. The method of claim 1, wherein an indication corresponding to the number of repeated transmissions is signaled in the DCI message or the MAC message, and the indication comprises a number of times (M) the reference signal is repeated within a predetermined time period or repeated consecutively over available OFDM symbols, wherein M is an integer that is greater than one.

3. The method of claim 1, wherein the reference signal comprises a periodic reference signal, and wherein an indication corresponding to the number of repeated transmissions is signaled in the DCI message or the MAC message, and the indication comprises a number of times (K) the reference signal is repeated in each period in N consecutive periods, and wherein K and N are positive integers.

4. The method of claim 1, wherein an indication corresponding to the number of repeated transmissions is signaled in the DCI message or the MAC message, and the indication comprises a time interval of the reference signal between adjacent transmissions.

5. The method of claim 1, wherein an indication corresponding to the number of repeated transmissions is signaled in the DCI message or the MAC message, and the indication comprises a number of times (K) the reference signal is repeated in a time slot.

6. The method of claim 1, wherein the reference signal is a sounding reference signal (SRS), a demodulation reference signal (DMRS) or a phase tracking reference signal (PTRS).

7. A method for wireless communication, comprising:

transmitting, by a second communication node to a first communication node, a Radio Resource Control (RRC) message comprising at least one parameter of a reference signal;

transmitting, by the second communication node to the first communication node, a Downlink Control Information (DCI) format message or a Medium Access Control (MAC) message that is configured to cause the first communication node to modify the at least one parameter of the reference signal included in the RRC message;

receiving, by the second communication node from the first communication node, the reference signal, wherein before the receiving of the reference signal, at least one parameter of the reference signal has been modified as the at least one modified parameter by the first communication node, based on the Downlink Control Information (DCI) format message or the Medium Access Control (MAC) message, wherein at least one modified parameter comprises a time-domain position of a first symbol of the reference signal, and a number of repeated transmissions of the reference signal; and performing a channel estimation operation based on the reference signal, and wherein the first communication node is a wireless device and the second communication node is a network node.

8. The method of claim 7, wherein an indication corresponding to the number of repeated transmissions is signaled in the DCI message or the MAC message, and the indication comprises a number of times (M) the reference signal is repeated within a predetermined time period or repeated consecutively over available OFDM symbols, wherein M is an integer that is greater than one.

9. The method of claim 7, wherein the reference signal comprises a periodic reference signal, and wherein an indication corresponding to the number of repeated transmissions is signaled in the DCI message or the MAC message, and the indication comprises a number of times (K) the reference signal is repeated in each period in N consecutive periods, and wherein K and N are positive integers.

10. The method of claim 7, wherein an indication corresponding to the number of repeated transmissions is signaled in the DCI message or the MAC message, and the indication comprises a time interval of the reference signal between adjacent transmissions.

11. The method of claim 7, wherein an indication corresponding to the number of repeated transmissions is signaled in the DCI message or the MAC message, and the indication comprises a number of times (K) the reference signal is repeated in a time slot.

12. The method of claim 7, wherein the reference signal is a sounding reference signal (SRS), a demodulation reference signal (DMRS) or a phase tracking reference signal (PTRS).

13. A method for wireless communication, comprising: receiving, by a multiple-input multiple-output (MIMO) first communication node from a second communication node, a Radio Resource Control (RRC) message comprising configuration parameters of a second reference signal associated with a first reference signal, wherein the configuration parameters include an identifier of the second reference signal and an indication that the second reference signal repeats at least a portion of the first reference signal;

receiving, by the MIMO first communication node from the second communication node, a Downlink Control Information (DCI) format message or a Medium Access Control (MAC) message that is configured to cause the MIMO first communication node to modify at least one of the configuration parameters of the second reference signal included in the RRC message;

modifying at least one of the configuration parameters of the second reference signal as at least one modified parameter based on the Downlink Control Information (DCI) format message or the Medium Access Control (MAC) message;

transmitting, after the modifying of the at least one of the configuration parameters of the second reference signal, by the multiple-input multiple-output (MIMO) first communication node to the second communication node, the first reference signal and the second reference signal, wherein the first reference signal and the second reference signal are transmitted from a common antenna port to enable a joint channel estimation operation, wherein the at least one modified parameter comprises an indication whether the second reference signal is being repeated with respect to the first reference signal, a number of repetitions of the second reference signal, and a time-domain position of a first symbol of the second reference signal with respect to the first reference signal, and wherein the MIMO first communication node is a wireless device and the second communication node is a network node.

14. The method of claim 13, wherein the first reference signal is a sounding reference signal (SRS), a demodulation reference signal (DMRS) or a phase tracking reference signal (PTRS).

15. A method for wireless communication, comprising:

transmitting, by a second communication node to a multiple-input multiple-output (MIMO) first communication node, a Radio Resource Control (RRC) message comprising configuration parameters of a second reference signal associated with a first reference signal, wherein the configuration parameters include an identifier of the second reference signal and an indication that the second reference signal repeats at least a portion of the first reference signal;

transmitting, by the second communication node to the MIMO first communication node, a Downlink Control Information (DCI) format message or a Medium Access Control (MAC) message that is configured to cause the MIMO first communication node to modify at least one of the configuration parameters of the second reference signal included in the RRC message;

receiving, by the second communication node from the multiple-input multiple-output (MIMO) first communication node, the first reference signal and the second reference signal, wherein the first reference signal and the second reference signal are configured to be transmitted from a common antenna port to enable a joint channel estimation operation, wherein before the receiving of the first reference signal and the second reference signal, at least one of the configuration parameters of the second reference signal has been modified as at least one modified parameter by the first communication node, based on the Downlink Control Information (DCI) format message, or the Medium Access Control (MAC) message, and wherein the at least one modified parameter comprises an indication whether the second reference signal is being repeated with respect to the first reference signal, a number of repetitions of the second reference signal, and a time-domain position of a first symbol of the second reference signal with respect to the first reference signal; and performing, based on the first reference signal and the second reference signal, the joint channel estimation operation, and wherein the MIMO first communication node is a wireless device and the second communication node is a network node.

16. The method of claim 15, wherein the first reference signal is a sounding reference signal (SRS), a demodulation reference signal (DMRS) or a phase tracking reference signal (PTRS).

* * * * *